(12) United States Patent
Tissot et al.

(10) Patent No.: US 10,146,309 B2
(45) Date of Patent: Dec. 4, 2018

(54) ACTUATOR FOR A TACTILE INTERFACE MODULE WITH HAPTIC FEEDBACK

(71) Applicant: DAV, Créteil (FR)

(72) Inventors: Jean-Marc Tissot, Creteil (FR); Anthony Aubry, Créteil (FR)

( * ) Notice: Subject to any disclaimer, the term of this patent is extended or adjusted under 35 U.S.C. 154(b) by 0 days.

(21) Appl. No.: 14/651,525

(22) PCT Filed: Nov. 21, 2013

(86) PCT No.: PCT/FR2013/000302
§ 371 (c)(1),
(2) Date: Jun. 11, 2015

(87) PCT Pub. No.: WO2014/091090
PCT Pub. Date: Jun. 19, 2014

(65) Prior Publication Data
US 2015/0316987 A1 Nov. 5, 2015

(30) Foreign Application Priority Data

Dec. 13, 2012 (FR) ...................................... 12 03411

(51) Int. Cl.
*G06F 3/041* (2006.01)
*G06F 3/01* (2006.01)
*B60K 37/06* (2006.01)

(52) U.S. Cl.
CPC ............. *G06F 3/016* (2013.01); *B60K 37/06* (2013.01); *B60K 2350/1024* (2013.01); *B60K 2350/1028* (2013.01)

(58) Field of Classification Search
None
See application file for complete search history.

(56) References Cited

U.S. PATENT DOCUMENTS 6,118,435 A * 9/2000 Fujita ...................... G06F 3/016
345/173
2002/0149561 A1* 10/2002 Fukumoto .......... G01C 21/3664
345/156

(Continued)

FOREIGN PATENT DOCUMENTS

FR 2 966 613 A1 4/2012

OTHER PUBLICATIONS

International Search Report issued in PCT/FR2013/000302 dated Apr. 3, 2014 (2 pages).

*Primary Examiner* — Stephen T Reed
(74) *Attorney, Agent, or Firm* — Osha Liang LLP

(57) ABSTRACT

The invention relates to an actuator for a tactile interface module (1) with haptic feedback, to be connected to a tactile surface (3) that can detect pressure by a user and can generate haptic feedback according to a detected pressure, and comprising: a frame (11); a mobile core (13) cooperating with the frame (11), to be movably driven between end positions in order to generate the haptic feedback; electromagnetic actuating means (15, 17) for movably driving the mobile core (13); fixing elements (23) for connecting the actuator to the tactile surface (3); and elastic means (21) defining an idle position of the mobile core (13) in the absence of the actuating means (15, 17) driving the core, characterized in that the elastic means (21) are arranged around the fixing elements (23).

12 Claims, 2 Drawing Sheets

(56) References Cited

U.S. PATENT DOCUMENTS

Figure 1:
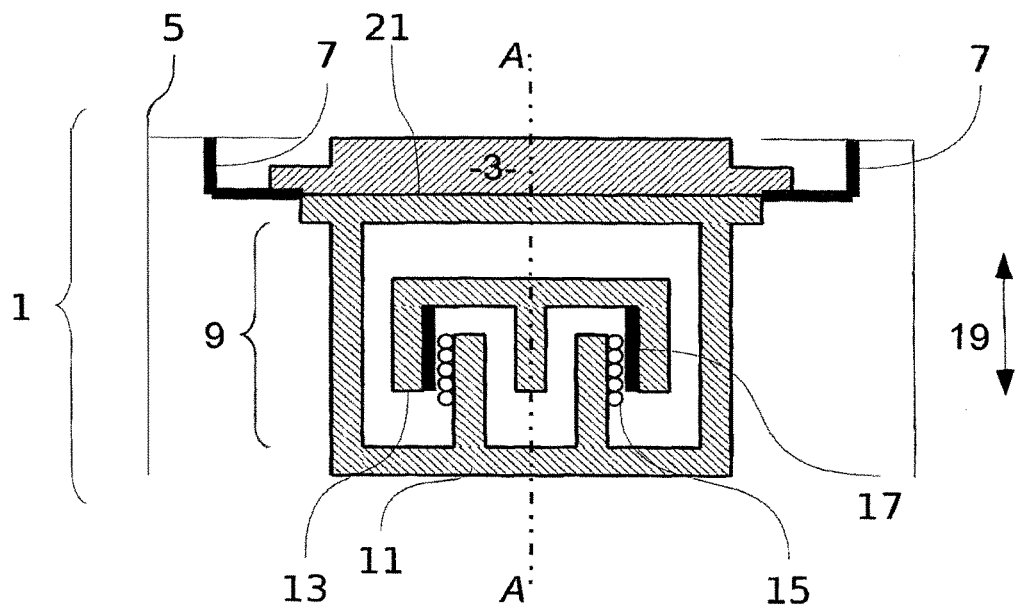

| | | | |
|---|---|---|---|
| 2003/0076298 A1* | 4/2003 | Rosenberg | G06F 3/016 345/156 |
| 2004/0217671 A1* | 11/2004 | Rosenthal | A61M 5/142 310/328 |
| 2006/0109256 A1* | 5/2006 | Grant | G06F 3/016 345/173 |
| 2011/0037546 A1* | 2/2011 | Marie | G06F 3/016 335/230 |
| 2011/0227849 A1 | 9/2011 | Olien et al. | |
| 2013/0207793 A1* | 8/2013 | Weaber | G06F 1/1601 340/407.2 |

* cited by examiner

ACTUATOR FOR A TACTILE INTERFACE MODULE WITH HAPTIC FEEDBACK

The present invention relates to an actuator for a touch interface module, in particular for a motor vehicle, notably making it possible to transmit a haptic feedback to a user, such as a vibratory feedback.

When a user exerts a pressure on the touch surface of a touch interface module with touch feedback, the pressure applied can be measured and/or the location at the point where the pressure is exerted can be determined. In this case, a contact by the user, is, for example, associated with the selection of a command.

Furthermore, to signal for example to the user that his or her command has indeed been taken into account, notably when driving at night or when operating blind, a haptic feedback is generated so as to allow the user to remain concentrated on the road.

For this, there are command modules with haptic feedback comprising actuators, such as electromagnetic actuators, linked to the interface module to transmit a vibratory movement, so that the user perceives a haptic feedback informing him or her that his or her command has indeed been taken into account.

These electromagnetic actuators comprise a coil and one or more magnets that are translationally mobile relative to the coil. When the coil is powered, the magnets are set in motion, and this motion is transmitted to the touch surface.

To this end, the subject of the invention is an actuator for a touch interface module with haptic feedback, intended to be linked to a touch surface suitable for detecting a contact by a user, and suitable for generating a haptic feedback as a function of a detected contact and comprising
 a frame,
 a mobile core cooperating with the frame, intended to be driven in movement between extreme positions to generate the haptic feedback,
 electromagnetic actuation means for driving the mobile core in movement,
 fixing elements, intended to link the actuator to the touch surface,
 elastic means defining a rest position of the mobile core in the absence of driving by the actuation means,
 characterized in that the elastic means are arranged around said fixing elements.

An actuator for a touch interface module with haptic feedback is thus produced with a small footprint.

The actuator can further comprise one or more features, taken separately or in combination, out of those which follow.

The fixing means form a guide for the movement of the mobile core which makes it possible to not have to implement additional guides for said movement.

The first and second elastic means define a floating rest position of the mobile core, which allows for a more efficient actuation with the same energy supplied.

The elastic means comprise helical springs wound around fixing elements, the helical springs having a tubular form which advantageously surrounds the fixing elements.

The elastic means comprise spring blades which in turn include piercings, the fixing elements passing through said piercings, in particular for flatter embodiments.

The elastic means comprise an elastic material such as urethane, an expanded polymer, an ionically cross-linked polymer, or rubber, potentially less expensive than the previous metallic elements.

The elastic means are compression prestressed, again with a view to a flatter embodiment.

The fixing elements comprise screws, which allow for an adjustment or tightening of the dimensions and/or of the stiffness of the elastic elements.

The fixing elements comprise rivets that are potentially less expensive.

The fixing elements comprise domed-headed elastic rods, without any metal, and potentially even less expensive.

The mobile core comprises at least one magnet, and the frame comprises a coil such that the fixed frame receives the element requiring a power supply.

The frame comprises a body bearing a part of the actuation means and a support-forming bottom, and in that the body and the bottom comprise a temporary fixing, and are assembled by the fixing elements. This temporary fixing makes it possible during assembly, to transport the semi-finished product and have an integral component.

The temporary fixing comprises a clipping by shape co-operation, a simple and inexpensive temporary fixing.

Also a subject of the invention is the associated touch interface module with haptic feedback, characterized in that it comprises an actuator as previously described.

Figure 2:
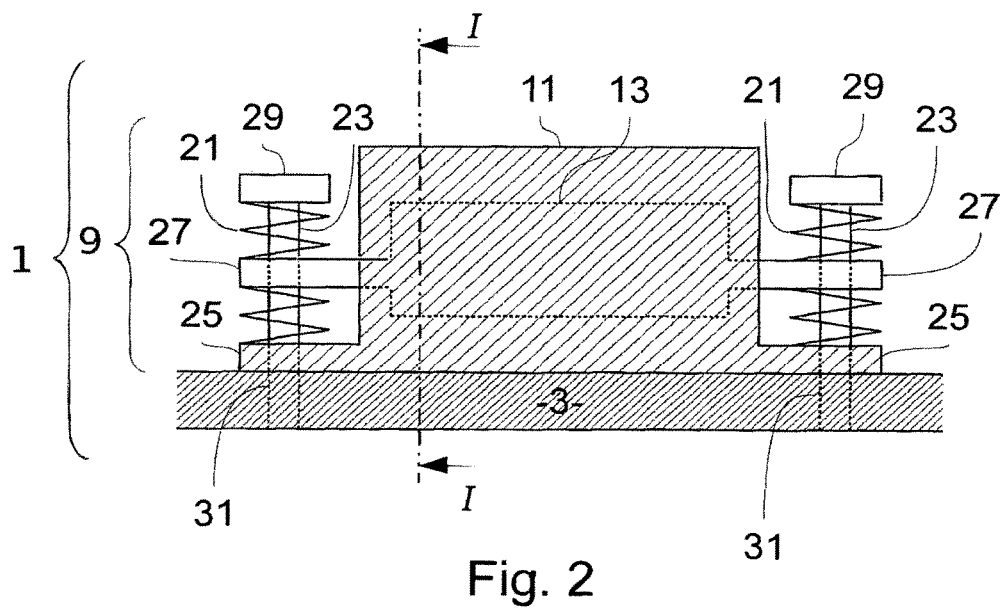
Figure 3:
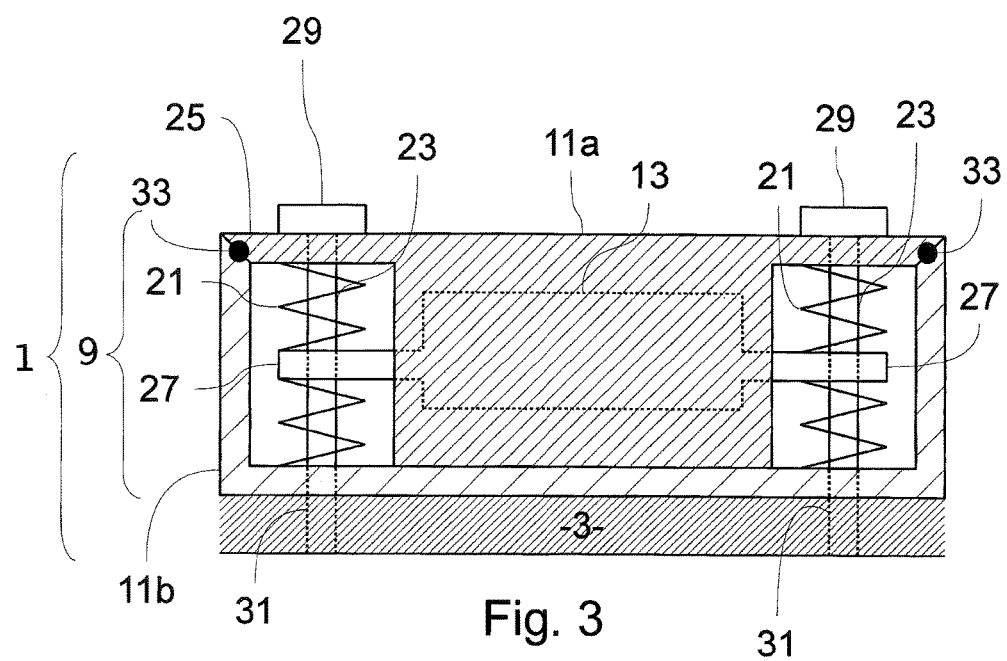

Other features and advantages of the invention will emerge from the following description, given by way of example and in a nonlimiting manner, in light of the attached drawings in which:

FIG. 1 schematically shows a transverse cross-sectional view of an interface module according to a so-called suspended embodiment, in which the actuator forms an isolated block, fixed to the touch surface to be set in motion;

FIG. 2 schematically shows the interface module of FIG. 1 by profile view, FIG. 3 shows an alternative interface module embodiment, by profile view.

In all the figures, the same elements bear the same reference numbers.

The invention relates to a touch interface module with haptic feedback 1, for example for a motor vehicle control panel, or even for a central console of a motor vehicle, making it possible to control electrical or electronic systems of the vehicle, and being able to transmit a haptic feedback to a user who has for example modified or selected a command so as to assure the user that the modified or selected command has been taken into account.

The interface module comprises a touch surface 3, for example using a capacitive or resistive technology integrated on the touch screens or touch pads, even simple areas of button type, sliders using the capacitive or resistive technologies (called FSR, for Force Sensing Resistor) to detect the location of the finger of a user (and additionally the force in the case of a resistive technology) on a position of its surface corresponding to a command. It is also possible to use a touch pad, transparent and superposed on a display screen, operating for example by detection of surface waves.

In FIG. 1, the touch surface is linked in a floating manner to the frame 5 of the touch interface module 1. The link between the surface 3 and the frame 5 is made by a link 7 of semi-rigid membrane type, or any other fixing means allows limited movements, notably in vibration along the axis at right angles to the touch surface 3.

The touch surface 3 is linked to an actuator 9 which provokes the haptic feedback upon the detection of the contact by the user. This actuator 9 comprises, on the one hand, a frame 11, secured to the touch surface 3, and a mobile core 13 co-operating with the frame.

The mobile core 13, housed in the frame 11, is set in motion between extreme positions by electromagnetic actuation means 15, 17. During this reciprocating movement, the core alternates acceleration and deceleration phases, during which the mobile core 13 drives the movement of the touch surface 3, and therefore the haptic feedback.

To produce the electromagnetic actuation means 15, 17, the frame 11 bears a coil 15 that can supply a magnetic field and the mobile core 13 bears at least one magnet 17, preferentially several arranged as close as possible to the coil 15, and is free in translation along the axis A-A.

It is also possible to produce the reverse assembly, the coil 15 then being secured to the mobile core 13 and the magnet or magnets 17 then being secured to the frame 11.

FIG. 1 shows an embodiment of a so-called "suspended" actuator. Suspended should be understood to mean that the actuator 9 is not linked to the frame 5 of the touch interface module 1, and the frame 11 of the actuator is secured to the touch surface 3.

The mobile core 13 has an E-shaped section in which the central branch is driven into a corresponding portion with U-shaped section of the frame 11.

FIG. 2 shows the actuator of FIG. 1 schematically represented in profile, such that elastic means 21 and fixing elements 23 of said actuator 9, previously not represented, are visible.

FIG. 2 notably shows the line I-I of the cross section of FIG. 1. In particular, said cross section is transversal, and the elastic means 21 and the fixing elements 23, which are situated at the longitudinal ends, are therefore invisible in FIG. 1.

In FIG. 2, it can notably be seen that the frame 11 comprises, at its lateral ends, end tongues 25, pierced at their center. The mobile core 13 also comprises end tongues 27, pierced at their center, arranged such that the piercings of the tongues 25, 27 borne respectively by the frame 11 and the mobile core 13 are aligned on the axis A-A.

The piercings of the tongues 25, 27 accommodate the fixing elements 23, here schematically represented in the form of screws, which form translational guides for the mobile core 13. Alternatively, it is possible to use dedicated guides of dovetail or rectangular slideway type between the part 13 and the frame 11 to provide this function.

In particular, the end tongues 27 borne by the mobile core 13 slide along the body of the screws forming the fixing elements during the movement of said mobile core 13.

The elastic means 21, here helical springs are arranged around the fixing elements 23, with a helical spring 21 on either side of the end tongues 27 of the mobile core 13. In particular, the helical springs 21 are here wound around screws forming fixing elements 23.

Furthermore, or alternatively, the elastic means can comprise spring blades which in turn include piercings, the fixing elements 23 passing through said piercings, if the space is limited along the fixing elements 23.

Furthermore, the elastic means 21 can comprise an elastic material such as urethane, an expanded polymer, an ionically cross-linked polymer, or rubber, for example in ring or tube form surrounding the fixing elements 23.

One end of each screw 23 comprises a head 29 of greater diameter, the other end 31 being screwed into a pre-piercing of a support of the touch surface 3.

The head of each screw 23 advantageously retains one of the helical springs 21, and compression-prestresses it against the corresponding end tongue 27 of the mobile core 13. The helical spring 21 situated facing relative to the end tongue 27 of the mobile core 13 is, for its part, prestressed between the tongue 27 and the pad bearing the touch surface 3.

Another embodiment in which the elastic means 21 are extension-prestressed can however also be envisaged.

Other embodiments are also envisaged in which the fixing elements 23 comprise rivets, pressed on assembly, or domed-headed plastic rods hot on assembly.

The elastic means 21 thus define a floating rest position of the mobile core, in the absence of actuation by the coil 15 and the magnets 17 forming the actuation means. This floating position allows for a more efficient actuation with the same energy supplied.

FIG. 3 shows an alternative interface module 1 embodiment.

The embodiment of FIG. 3 differs from that of FIG. 2 in that the frame 11 is made up of a plurality of parts, here two in particular.

The frame here comprises a body 11a, notably comprising the portion with U-shaped section which bears the coil 15 and the end tongues 25, and a bottom 11b, which forms the bearing surface on the pad of the touch surface 3.

The bottom 11b can also comprise lateral walls (not represented) to form an enclosure, at least partial, which enclosure the end tongues 25 of the body 11a close. The enclosure that is thus obtained notably protects the actuator 9 from outside elements such as dust.

The body 11a and the bottom 11b of the frame are linked by a temporary fixing 33, for example by shape co-operation of clipping type.

In this way, the body 11a and the bottom 11b can be handled separately, then pre-assembled by means of the temporary fixing 33, before being finally assembled by the fixing means 23 which definitively hold said body 11a and the bottom 11b together.

In particular, the body 11a and the bottom 11b can thus be designed in such a way as to be obtained by molding in fewer steps, and/or in simplified steps, for example without requiring any back draft, cutting or subsequent milling. Furthermore, the body 11a is potentially more easy to handle when mounting the coil 15, for example by automated winding of metal cable around the portion with U-shaped section.

The temporary fixing 33 allows for a preassembly of the frame 11, possibly with the core 13 previously inserted in its position, so as to obtain a semi-finished module that is easy to handle. Thus, the preassembly and the mounting and the final assembly that said mounting implies can be performed at different stations, potentially geographically distant.

The invention thus makes it possible to obtain an actuator 9 that is more compact, easier to assemble and therefore potentially less costly. Furthermore, the elastic means 21 and the tightening of the fixing elements 23 makes it possible to significantly reduce the play of the parts involved.

The invention claimed is:

1. An actuator for a touch interface module with haptic feedback, configured to be linked to a touch surface suitable for detecting a contact by a user, and suitable for generating a haptic feedback as a function of a detected contact and comprising:
   a frame;
   a mobile core cooperating with the frame, the mobile core configured to be driven in movement between extreme positions by electromagnetic actuation means in the mobile core and in the frame, and configured to alternate acceleration and deceleration phases, to drive movement of the touch surface to generate the haptic feedback;

electromagnetic actuation means for driving the mobile core in movement;

fixing elements configured to link the actuator to the touch surface; and elastic means comprising a first spring and a second spring disposed on opposite sides of the mobile core and coupled to the fixing elements, the elastic means defining a floating rest position of the mobile core in the absence of driving by the actuation means, wherein the fixing elements form a guide for the movement of the mobile core, wherein the elastic means are arranged around said fixing elements, and wherein the floating rest position is a predetermined position along the guide that is implemented by the elastic means.

2. The actuator as claimed in claim 1, wherein the first spring and the second spring are helical springs wound around the fixing elements.

3. The actuator as claimed in claim 1 the elastic means comprise spring blades which in turn include piercings, the fixing elements passing through said piercings.

4. The actuator as claimed in claim 1 the elastic means comprise an elastic material selected from the group consisting of urethane, an expanded polymer, an ionically cross-linked polymer, and rubber.

5. The actuator as claimed in claim 1 the elastic means are compression prestressed.

6. The actuator as claimed in claim 1 the fixing elements comprise screws.

7. The actuator as claimed in claim 1 the fixing elements comprise rivets.

8. The actuator as claimed in claim 1 the fixing elements comprise domed-headed plastic rods.

9. The actuator as claimed in claim 1 the mobile core comprises at least one magnet, and the frame comprises a coil.

10. The actuator as claimed in claim 1 the frame comprises a body bearing a part of the actuation means and a support-forming bottom, and in that the body and the bottom comprise a temporary fixing, assembled by the fixing elements.

11. The actuator as claimed in claim 10, wherein the temporary fixing comprises a clipping by shape co-operation.

12. A touch interface module with haptic feedback comprising:

a touch surface suitable for detecting a contact by a user; and an actuator suitable for generating a haptic feedback as a function of a detected contact and comprising:

a frame, a mobile core cooperating with the frame, the mobile core configured to be driven in movement between extreme positions by electromagnetic actuation means in the mobile core and in the frame, and configured to alternate acceleration and deceleration phases, to drive movement of the touch surface to generate the haptic feedback, electromagnetic actuation means for driving the mobile core in movement, fixing elements configured to link the actuator to the touch surface, elastic means comprising a first spring and a second spring disposed on opposite sides of the mobile core and coupled to the fixing elements, the elastic means defining a floating rest position of the mobile core in the absence of driving by the actuation means, wherein the fixing elements form a guide for the movement of the mobile core and the elastic means are arranged around said guide-forming fixing elements, wherein the floating rest position is a predetermined position along the guide that is implemented by the elastic means.

* * * * *